US009493145B2

(12) United States Patent
Mehr et al.

(10) Patent No.: US 9,493,145 B2
(45) Date of Patent: Nov. 15, 2016

(54) METHOD FOR AUTOMATICALLY PREVENTING AQUAPLANING

(75) Inventors: Wilfried Mehr, Wolfurt (AT); Matthias Strauss, Pfungstadt (DE); Alfred Eckert, Mainz-Hechtesheim (DE)

(73) Assignees: Conti Temic microelectronic GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 228 days.

(21) Appl. No.: 13/579,412

(22) PCT Filed: Jan. 22, 2011

(86) PCT No.: PCT/DE2011/000063
§ 371 (c)(1),
(2), (4) Date: Sep. 18, 2012

(87) PCT Pub. No.: WO2011/100943
PCT Pub. Date: Aug. 25, 2011

(65) Prior Publication Data
US 2013/0035836 A1 Feb. 7, 2013

(30) Foreign Application Priority Data

Feb. 17, 2010 (DE) ........................ 10 2010 008 258

(51) Int. Cl.
*B60B 39/00* (2006.01)
*B60T 7/12* (2006.01)
(Continued)

(52) U.S. Cl.
CPC ............ *B60T 8/172* (2013.01); *B60T 2201/02* (2013.01); *B60T 2210/12* (2013.01); *B60T 2210/13* (2013.01); *B60T 2210/36* (2013.01); *B60T 2260/06* (2013.01)

(58) Field of Classification Search
CPC .................... B60T 2210/13; B60W 2550/148
See application file for complete search history.

(56) References Cited

U.S. PATENT DOCUMENTS 4,712,635 A 12/1987 Sumiya et al.
5,322,318 A * 6/1994 Kimura et al. .............. 280/5.51
(Continued)

FOREIGN PATENT DOCUMENTS

DE  198 52 631  5/2000
DE  198 54 964  6/2000
(Continued)

OTHER PUBLICATIONS

International Search Report of the International Searching Authority for International Application PCT/DE2011/000063, mailed Jun. 1, 2011, 2 pages, European Patent Office, HV Rijswijk, Netherlands.
(Continued)

*Primary Examiner* — Adam Tissot
*Assistant Examiner* — Tommy Worden
(74) *Attorney, Agent, or Firm* — W. F. Fasse

(57) ABSTRACT

A method of automatically preventing or reducing aquaplaning during the driving operation of a motor vehicle on a route provides that:
a) a camera-based road sign recognition of a road sign on a section of the route determines whether the road sign indicates a risk of aquaplaning on the section of the route,
b) at least one sensor device detects whether there is a wet road condition on the section of the route, and
c) a driving assistance function for preventing or reducing aquaplaning is carried out if the road sign recognition determines that the road sign indicates the risk of aquaplaning and the sensor device detects the wet road condition on the section of the route.

20 Claims, 2 Drawing Sheets

(51) Int. Cl.
*G05D 1/00* (2006.01)
*G06F 7/00* (2006.01)
*G06F 17/00* (2006.01)
*B60T 8/172* (2006.01)

(56) References Cited

U.S. PATENT DOCUMENTS

| | | | |
|---|---|---|---|
| 5,990,898 A * | 11/1999 | Urano | G06T 15/00 345/426 |
| 6,046,401 A * | 4/2000 | McCabe | G09F 9/33 136/244 |
| 6,298,297 B1 * | 10/2001 | Colby et al. | 701/85 |
| 6,801,638 B1 | 10/2004 | Janssen et al. | |
| 6,807,473 B1 | 10/2004 | Tran | |
| 6,856,882 B2 | 2/2005 | Raab | |
| 7,058,206 B1 * | 6/2006 | Janssen et al. | 382/104 |
| 7,317,973 B2 | 1/2008 | Dieterle | |
| 8,957,949 B2 | 2/2015 | Randler et al. | |
| 2003/0101805 A1 * | 6/2003 | Raab | 73/116 |
| 2004/0016870 A1 * | 1/2004 | Pawlicki et al. | 250/208.1 |
| 2004/0154715 A1 * | 8/2004 | Dufournier | 152/154.2 |
| 2004/0158366 A1 * | 8/2004 | Dieterle | 701/23 |
| 2005/0085987 A1 * | 4/2005 | Yokota et al. | 701/80 |
| 2005/0141997 A1 * | 6/2005 | Rast | F04D 25/088 416/229 R |
| 2005/0268708 A1 * | 12/2005 | Satou et al. | 73/146 |
| 2007/0050121 A1 | 3/2007 | Ammon et al. | |
| 2007/0124027 A1 * | 5/2007 | Betzitza et al. | 701/1 |
| 2008/0027607 A1 | 1/2008 | Ertl et al. | |
| 2008/0245456 A1 * | 10/2008 | Spetler | 152/209.1 |
| 2009/0128318 A1 | 5/2009 | Nagata et al. | |
| 2009/0248231 A1 * | 10/2009 | Kamiya | 701/23 |
| 2012/0143488 A1 * | 6/2012 | Othmezouri | B60T 7/22 701/301 |
| 2012/0167663 A1 | 7/2012 | Groitzsch et al. | |
| 2015/0153266 A1 * | 6/2015 | Mack | G01W 1/14 73/9 |

FOREIGN PATENT DOCUMENTS

| | | |
|---|---|---|
| DE | 100 60 333 | 6/2002 |
| DE | 101 39 668 | 2/2003 |
| DE | 102 56 726 | 6/2004 |
| DE | 102004016288 | 8/2005 |
| DE | 102004047914 | 3/2006 |
| DE | 102006022080 | 11/2007 |
| DE | 102008034908 | 3/2009 |
| EP | 0 412 791 | 2/1991 |
| JP | S60-143171 A | 7/1985 |
| JP | H06-087419 A | 3/1994 |
| JP | 2000-006787 A | 1/2000 |
| JP | 2007-533541 A | 11/2007 |
| JP | 2008-001304 A | 1/2008 |
| JP | 2009-110394 A | 5/2009 |
| WO | WO 02/25291 | 3/2002 |
| WO | WO 03/077222 | 9/2003 |

OTHER PUBLICATIONS

English Translation of PCT International Preliminary Report on Patentability of the International Searching Authority for International Application PCT/DE2011/000063, mailed Sep. 20, 2012, 5 pages, International Bureau of WIPO, Geneva, Switzerland.
Partial English translation of Japanese Office Action in Japanese Patent Application No. 2012-555291, mailed Jan. 7, 2015, 1 page.

* cited by examiner

METHOD FOR AUTOMATICALLY PREVENTING AQUAPLANING

CROSS-REFERENCE TO RELATED APPLICATIONS

This is a National Stage Application under 35 USC 371 of PCT International Application PCT/DE2011/000063 filed Jan. 22, 2011, and claims priority under 35 USC 119 of German Patent Application DE 10 2010 008 258.9 filed Feb. 17, 2010.

FIELD OF THE INVENTION

The invention relates to a method for automatically preventing or reducing aquaplaning or hydroplaning during the driving operation of a motor vehicle on a route.

BACKGROUND INFORMATION

When aquaplaning occurs, the disadvantage of existing systems, such as anti-lock braking systems (ABS) or systems for controlling the dynamics of vehicle movement (EPS, ESC), consists in the fact that they only react when the condition of aquaplaning is immediately imminent or has already begun.

For example, a method for recognizing the risk of the occurrence of aquaplaning is known from DE 100 60 333 A1, in which method the presence of a risk of aquaplaning is indirectly inferred from vehicle-movement-dynamics quantities and state data of the vehicle. To this end, a device is proposed that contains first means for determining a first propulsion quantity that describes the propulsion of the vehicle that is to be expected on account of the operating state of the engine and of the drivetrain, and that contains second means for determining a second propulsion quantity that describes the propulsion that is present during the driving operation of the vehicle and occurs on account of the longitudinal acceleration acting on the vehicle, wherein the presence of the risk of aquaplaning is inferred in dependence on a deviation of the first propulsion quantity from the second propulsion quantity.

Furthermore, said DE 100 60 333 A1 proposes in the event of a recognized risk of aquaplaning that the driver be warned, e.g., by showing a relative measure for the loss of tire-road adhesion, or that this information be supplied to a device (e.g., ESP) for influencing a quantity describing the vehicle movement in order to, e.g., carry out engine and/or brake interventions for speed reduction.

Furthermore, methods for stabilizing the vehicle in the event of the occurrence of aquaplaning are known (e.g., from DE 10 2008 034 908 A1). According to such methods, a desired behavior of the vehicle is determined and a yawing moment of the vehicle is generated in such a manner that an actual behavior of the vehicle is approximated to the desired behavior.

Finally, car-to-car-communication (C2C) systems for, e.g., exchanging route-related traffic and weather information between vehicles are also known. For example, DE 101 39 668 A1 deals with providing weather information and road condition data.

SUMMARY OF THE INVENTION

It is therefore an object of one or more embodiments of the invention to provide a method of the type mentioned above, by which it is possible to recognize the occurrence of a risk of aquaplaning in good time and which at the same time prevents the occurrence of or reduces the risk of aquaplaning as preventively as possible and avoids the aforementioned disadvantages.

According to an embodiment of the present invention, the method for automatically preventing aquaplaning during the driving operation of a motor vehicle on a route provides that:
a) information relating to a section of the route and regarding the risk of aquaplaning is provided in the motor vehicle,
b) at least one sensor device for determining a wet pavement is provided, and
c) an assistance function for preventing or reducing aquaplaning is carried out if there is a section of the route having a risk of aquaplaning and if a wet pavement is detected.

Here, the information relating to the section of the route according to procedure step a) is preferably provided by means of road sign recognition of a road sign that indicates aquaplaning.

BRIEF DESCRIPTION OF THE DRAWINGS

In order that the invention may be clearly understood, it will now be explained in further detail with reference to the accompanying drawings, wherein.

DETAILED DESCRIPTION OF EXAMPLE EMBODIMENTS OF THE INVENTION

Since more and more vehicles are equipped with modern driver assistance systems that also comprise an electronic road sign recognition system in order to, e.g., warn the driver in the event of speeding, no additional effort is required for detecting the road sign "Risk of skidding on wet or dirty pavement" classified as a danger sign and for providing it as information relating to the section of the route and regarding the risk of aquaplaning according to the invention.

Figure 1:
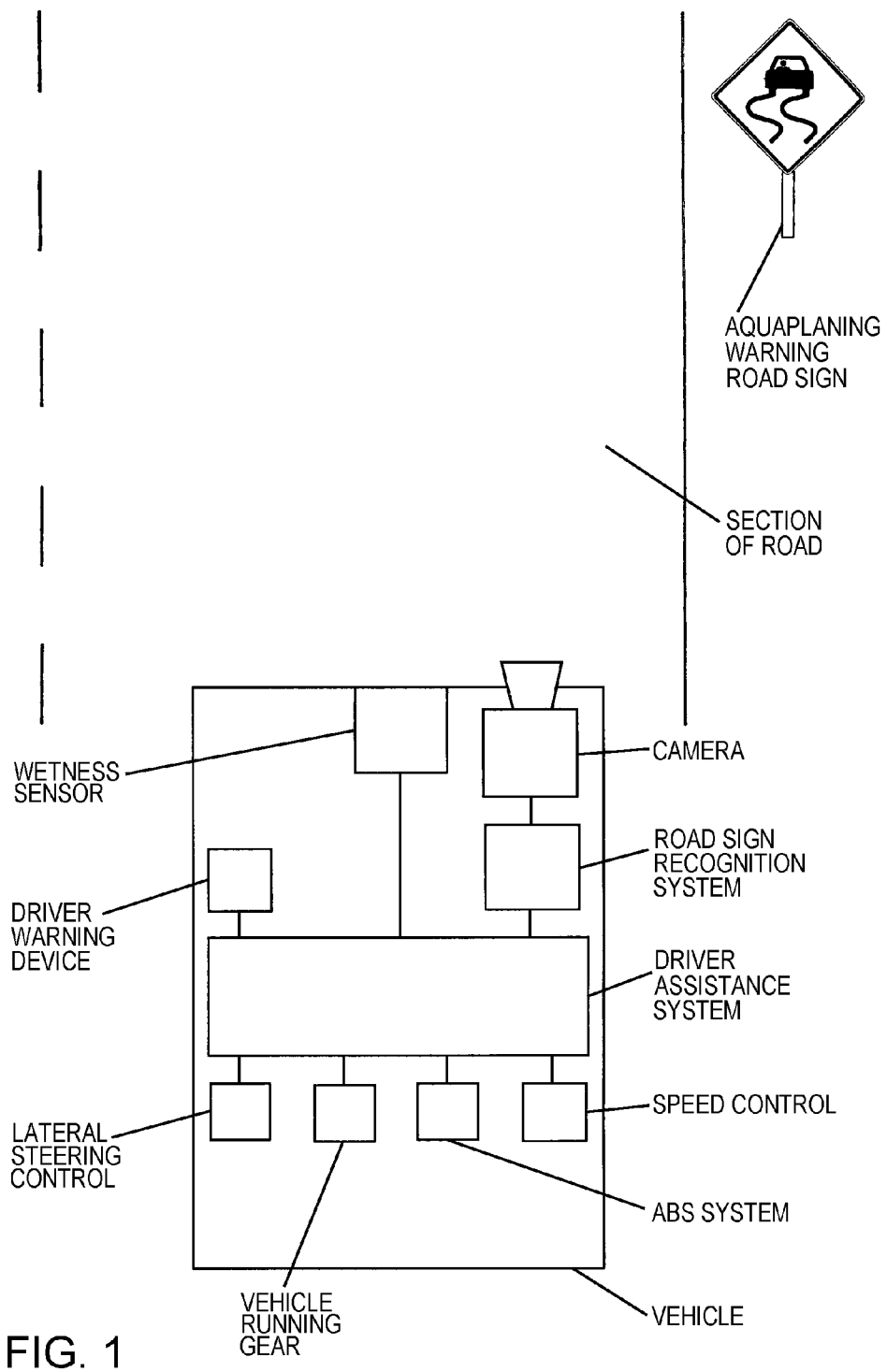
FIG. 1 is a schematic block diagram of a vehicle that is driving along a section of a road having a road sign, and that is equipped with systems and devices for performing an embodiment of the method according to the invention.
Figure 2:
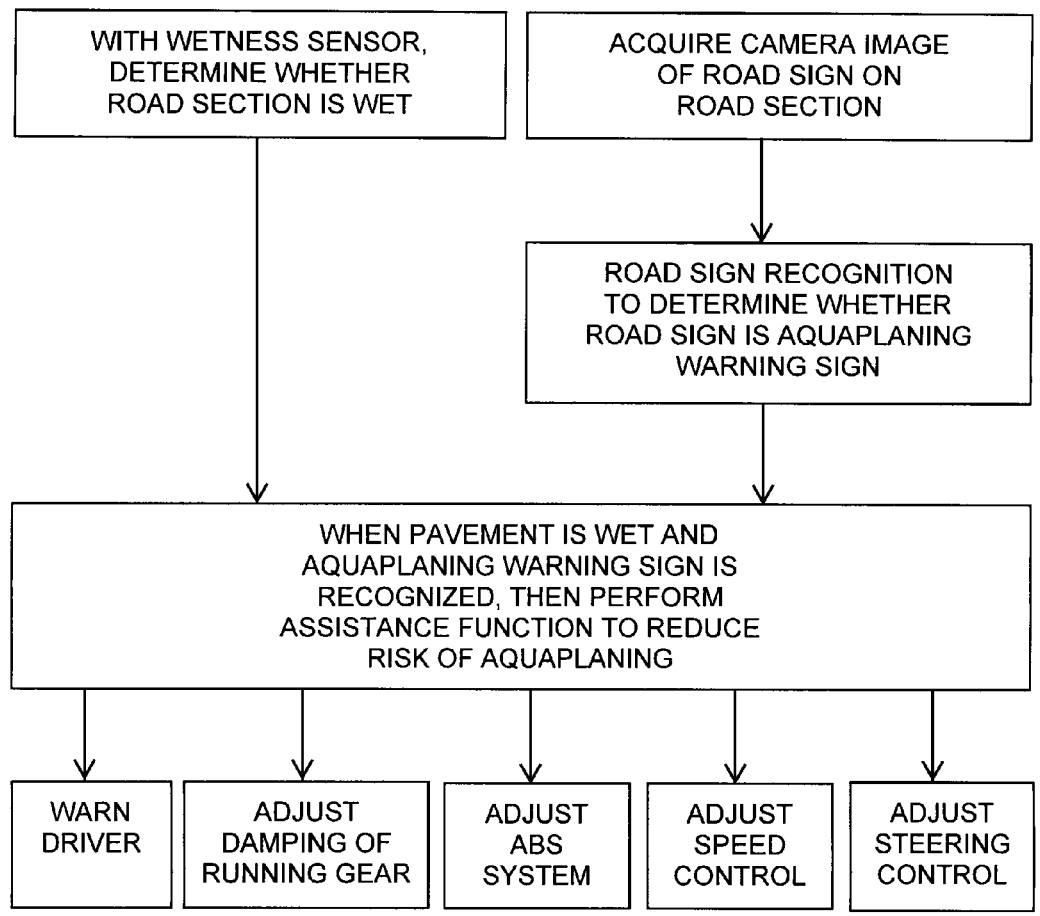
FIG. 2 is a schematic flow diagram of method steps in an embodiment of the method according to the invention.

As schematically indicated in FIGS. 1 and 2, road sign recognition is usually performed by means of a camera that records images of the environment in front of the vehicle and delivers corresponding image data to an onboard computer that analyzes and classifies the image data by means of an algorithm in order to identify a road sign therefrom.

Such a method is known from, e.g., DE 198 52 631 A1.

The information relating to the section of the route and regarding the presence of a risk of aquaplaning may also be provided by means of a telematics function, which means, for example, that vehicles communicate with each other on the road and by means of an installed infrastructure, such as V2V (vehicle to vehicle) or C2C (car to car), and acquire and exchange data that are available in the vehicle (in particular, data indicating aquaplaning), possibly by means of a central computer. For example, said data can be used to determine whether it is raining, i.e., whether there is a risk of aquaplaning, or whether a traffic jam is developing.

Finally, it is also possible to use a digital map within a navigation system installed in the motor vehicle, which map contains information relating to a section of the route and regarding a risk of aquaplaning and makes said information available when the vehicle is traveling on such a route.

As also schematically indicated in FIGS. 1 and 2, the information regarding the presence of a risk of aquaplaning is linked to the information indicating whether the pavement on which the motor vehicle is traveling is wet or not. Said information regarding wetness is made available by means of a sensor device (preferably a rain sensor) according to procedure step b).

Alternatively or in addition, a sensor device that evaluates the windshield wiper activity may be provided for determining a wet pavement.

It is particularly advantageous to design the sensor device for determining the information regarding wetness as an aquaplaning sensor unit that evaluates vehicle-movement-dynamics vehicle data and vehicle state data. For example, the method described in DE 100 60 333 A1 is suitable therefor.

Finally, an optical sensor that detects the pavement surface, preferably a camera, may also be used to determine a wet pavement.

If a section of the route having a risk of aquaplaning has been identified and a wet pavement has been detected by means of the sensor device, an assistance function that takes a preventive measure for preventing aquaplaning or at least for reducing the risk of the occurrence of aquaplaning is initiated automatically as schematically represented in FIGS. 1 and 2.

Preferably, such an assistance function may be a visual, acoustic and/or haptic warning of aquaplaning outputted to the driver, wherein the risk of aquaplaning is indicated to the driver in the instrument cluster of the vehicle, for example.

A further measure, in particular if the driver does not react to the warning, may consist in forwarding a deceleration request triggered off by actuating the brake pedal of the motor vehicle to the driving engine of the motor vehicle for implementation and implementing said request in the driving engine in such a manner that the wheels of the vehicle do not lock.

An assistance function may also consist in implementing an acceleration request with a lower value over a longer period of time in comparison with the acceleration request or suppressing said acceleration request completely, said acceleration request being triggered off by actuating the gas pedal of the motor vehicle. This prevents the actual occurrence of aquaplaning caused by, e.g., intensive acceleration.

Furthermore, the assistance function may consist in adjusting the damping of the running gear of the motor vehicle, particularly in switching to hard damping.

Regarding safety, an assistance function that adjusts/reduces the speed of the vehicle to a maximum value, preferably to 80 km/h, is important. Said speed of 80 km/h is the recommended speed at which no aquaplaning of the vehicle occurs, yet.

Finally, embedding the assistance function into a driver assistance system or into active safety systems is particularly advantageous.

Preferably, the assistance function can adjust an ABS system of the motor vehicle. In particular, it can make the ABS system more sensitive.

A further system suitable therefor is a system for controlling the dynamics of vehicle movement that is adjusted (in particular, made more sensitive) by the assistance function, wherein it is particularly advantageous if the system for controlling the dynamics of vehicle movement is parameterized thereby in such a manner that the wheels of the vehicle do not lock when there is an electronic request for braking power for the individual wheels of the vehicle.

In an advantageous realization of the inventive method, performing an assistance function for preventing aquaplaning comprises the adaptation of a speed control system, e.g., of a CC (Cruise Control) system or an ACC (Adaptive Cruise Control) system. CC systems can automatically keep the speed of the motor vehicle constant at a predetermined value. An ACC system can additionally adapt the speed of the motor vehicle to the speed of the vehicle ahead. Preferably, said adaptation is performed with active speed control systems only. A speed control system is active if the system is switched on and controls the speed of the motor vehicle when or while the inventive method is carried out.

In a situation in which the motor vehicle enters a region where it is confronted with a risk of aquaplaning, known speed control systems would not change the speed of the motor vehicle.

In an advantageous realization of the inventive method, a speed control system can be adapted in such a situation in such a manner that the speed of the motor vehicle is reduced. This is preferably done if a section of the route having a risk of aquaplaning has been identified and a wet pavement has been detected by means of a sensor device.

If the speed control system is an ACC system (in particular, a system having means for the detection of speed limits), the speed limit that is mandatory and/or recommended for wet roads (e.g., 80 km/h) can be taken into consideration if a risk of aquaplaning has been recognized. The currently valid speed limit may be provided by means of the ACC system itself or by means of, e.g., a GPS-based, camera-based and/or transponder-based road sign recognition system.

In a particular realization, a speed control system is switched off completely if a risk of aquaplaning has been recognized, in particular after informing the driver of the motor vehicle one or several times, e.g., by means of haptic, acoustic and/or visual signals.

If the motor vehicle in which the inventive method is used comprises highly automated systems that partly or completely take on the driver's longitudinal and/or lateral control tasks, said systems can be switched off if a risk of aquaplaning has been recognized, wherein they are preferably switched off after informing the driver of the motor vehicle. If the driver does not take on his or her driving tasks thereupon, the motor vehicle can be slowed down automatically and/or slowed down until it stops.

Finally, another embodiment of the invention provides that the performance of an assistance function can be deactivated by the driver of the motor vehicle at any time. To this end, a suitable man-machine interface has to be provided.

Of course, combining several above-mentioned measures in one assistance function and carrying them out simultaneously or at different times is advantageous from a safety-relevant perspective.

The most important advantage of the inventive method consists in the fact that the assistance function takes preventive and protective measures against the occurrence of aquaplaning automatically and not only when aquaplaning is immediately imminent or has already begun on account of indirect measurements. These preventive and protective measures also reduce the risk of the occurrence of aquaplaning substantially.

The invention claimed is:

1. A method of automatically preventing or reducing a risk of an occurrence of aquaplaning during driving operation of a motor vehicle on a route, comprising the steps:
   a) with a camera, acquiring a camera image of a road sign on a section of the route, and performing a road sign recognition of the road sign in the camera image to determine whether the road sign is an aquaplaning warning sign that indicates a risk of aquaplaning on the section of the route, b) with at least one sensor device, determining whether there is a wet pavement on the section of the route, and c) with a driver assistance system or an active safety system of the motor vehicle, carrying out a driving assistance function that helps proactively prevent or reduce the risk of the occurrence of aquaplaning of the motor vehicle before aquaplaning has already begun or is immediately imminent, automatically in response to the road sign recognition having determined that the road sign is an aquaplaning warning sign that indicates there is the risk of aquaplaning on the section of the route and the wet pavement having been determined to exist on the section of the route, without regard to actual vehicle dynamics of the motor vehicle and without regard to any condition of the vehicle itself.

2. The method according to claim 1, wherein said sensor device comprises an optical sensor that detects a pavement surface to determine the wet pavement on the pavement surface.

3. The method according to claim 1, wherein the driving assistance function comprises at least one of:
adjusting a damping of a running gear of the motor vehicle by switching to a hard damping of the running gear, or
adjusting an ABS system of the motor vehicle to make the ABS system more sensitive than before the adjusting of the ABS system.

4. The method according to claim 1, wherein the driving assistance function comprises reducing a driving speed of the motor vehicle so as not to exceed a predetermined maximum limit value.

5. The method according to claim 1, wherein the driving assistance function comprises adjusting an active speed control system of the motor vehicle, which is a cruise control (CC) system or an adaptive cruise control (ACC) system.

6. The method according to claim 5, wherein the adjusting of the active speed control system automatically reduces the driving speed of the motor vehicle to a pre-specified speed value that is pre-specified as applicable for wet roads.

7. The method according to claim 1, wherein the driving assistance function comprises switching off an active speed control system of the motor vehicle.

8. The method according to claim 7, further comprising informing the driver of the motor vehicle before switching off the active speed control system.

9. The method according to claim 1, wherein the driving assistance function comprises adjusting a vehicle-movement-dynamics control system of the motor vehicle to a more sensitive setting of parameters such that wheels of the motor vehicle do not lose adhesion on the wet pavement.

10. The method according to claim 1, wherein the driving assistance function comprises switching off a system for automatic longitudinal and lateral control of the motor vehicle.

11. The method according to claim 10, further comprising informing a driver of the motor vehicle before switching off the system for automatic longitudinal and lateral control of the motor vehicle.

12. The method according to claim 10, further comprising automatically reducing a driving speed of the motor vehicle or bringing the motor vehicle to a complete stop, if a driver of the motor vehicle does not manually carry out a lateral and longitudinal control of the motor vehicle after the switching off of the system for automatic longitudinal and lateral control of the motor vehicle.

13. The method according to claim 1, wherein the driving assistance function comprises forwarding to a driving motor of the motor vehicle, a deceleration request triggered by a driver's actuation of a brake pedal of the motor vehicle, and implementing a limitation on the deceleration request such that wheels of the motor vehicle do not lock.

14. The method according to claim 1, wherein an acceleration request is triggered by a driver's actuation of an accelerator pedal of the motor vehicle, and the driving assistance function comprises limiting the acceleration request by implementing an acceleration of the motor vehicle with a lower value in comparison to the acceleration request or by suppressing the acceleration request.

15. A method of automatically preventing or reducing a risk of an occurrence of aquaplaning of a motor vehicle while said motor vehicle is driving on a section of a roadway with a road sign along said section of said roadway, comprising:

a) with a sensor device, determining whether a roadway surface in said section of said roadway is wet and accordingly emitting a wetness signal;

b) with a camera, acquiring a camera image of said road sign along said section of said roadway;

c) with an electronic road sign recognition system, evaluating said camera image to determine whether said road sign is recognized as an aquaplaning warning sign that indicates a danger of aquaplaning for said section of said roadway; and d) when said wetness signal indicates that said roadway surface in said section of said roadway is wet and said evaluating of said camera image determines that said road sign along said section of said roadway is recognized as said aquaplaning warning sign that indicates said danger of aquaplaning for said section of said roadway, then based thereon and in response thereto, and without regard to actual vehicle dynamics of said motor vehicle and without regard to any condition of said motor vehicle itself, with a driver assistance system or active safety system of the vehicle automatically issuing an aquaplaning danger warning to a driver of the motor vehicle or automatically adjusting a driving operation of the motor vehicle to proactively prevent or reduce the risk of the occurrence of aquaplaning of the motor vehicle before aquaplaning has already begun or is immediately imminent.

16. A method of automatically reducing a risk of aquaplaning of a motor vehicle driving on a road, comprising the steps:

a) with a camera, acquiring an image of a road sign along the road;

b) with an electronic road sign recognition system, analyzing the image and thereby determining whether the road sign is recognized as a sign that warns of a risk of aquaplaning;

c) with a sensor device, determining whether there is a wet pavement on the road;

d) when the determining in the step b) and the determining in the step c) are both affirmative, then based thereon and in response thereto automatically triggering a driver assistance system or an active safety system of the motor vehicle to perform an assistance function that reduces a risk of aquaplaning of the motor vehicle, without regard to whether any aquaplaning is already occurring or is imminent, without regard to an actual interaction between tires of the motor vehicle and the road, without regard to whether aquaplaning is having any influence on the motor vehicle, and without regard to actual vehicle dynamics of the motor vehicle.

17. The method according to claim 16, wherein the triggering of the driver assistance system or the active safety system occurs before any aquaplaning has already begun or is immediately imminent, so that the assistance function proactively and preemptively reduces the risk of aquaplaning.

18. The method according to claim 16, wherein said sensor device comprises an optical sensor that acquires an optical image of a pavement surface of the road, and is configured to detect, in said optical image, wetness on said pavement surface as the determining of the wet pavement on the road.

19. The method according to claim 16, wherein the assistance function comprises adjusting a suspension of the motor vehicle to a harder damping.

20. The method according to claim 16, wherein the assistance function comprises adjusting at least one of an antilock braking system and a vehicle dynamics control system of said motor vehicle to a more sensitive setting.

* * * * *